(12) United States Patent
Verbrugge et al.

(10) Patent No.: US 10,141,569 B2
(45) Date of Patent: Nov. 27, 2018

(54) BATTERY LIFE BY CONTROLLING THE VOLTAGE WINDOW OF THE NEGATIVE ELECTRODE

(71) Applicant: GM GLOBAL TECHNOLOGY OPERATIONS LLC, Detroit, MI (US)

(72) Inventors: Mark W. Verbrugge, Troy, MI (US); Qinglin Zhang, Lexington, KY (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 427 days.

(21) Appl. No.: 14/973,439

(22) Filed: Dec. 17, 2015

(65) Prior Publication Data

US 2017/0179482 A1 Jun. 22, 2017

(51) Int. Cl.
| | | |
|---|---|---|
| *H01M 4/38* | (2006.01) | |
| *H01M 4/134* | (2010.01) | |
| *H01M 10/0525* | (2010.01) | |
| *H01M 10/44* | (2006.01) | |
| *H01M 4/02* | (2006.01) | |

(52) U.S. Cl.
CPC .......... *H01M 4/386* (2013.01); *H01M 4/134* (2013.01); *H01M 10/0525* (2013.01); *H01M 10/446* (2013.01); *H01M 2004/027* (2013.01); *H01M 2220/20* (2013.01); *H01M 2220/30* (2013.01)

(58) Field of Classification Search
CPC ...... H01M 4/386; H01M 4/134; H01M 4/392; H01M 10/0525
See application file for complete search history.

(56) References Cited

U.S. PATENT DOCUMENTS

| | | |
|---|---|---|
| 8,101,152 B1 | 1/2012 | Halalay et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,356,281 B2 | 5/2016 | Verbrugge et al. |

(Continued)

FOREIGN PATENT DOCUMENTS

| | | |
|---|---|---|
| CN | 106898820 A | 6/2017 |
| DE | 102016123977 A1 | 6/2017 |

*Primary Examiner* — Kenneth J Douyette
(74) *Attorney, Agent, or Firm* — Harness, Dickey & Pierce, P.L.C.

(57) ABSTRACT

In an example of a method for improving a life cycle of a battery containing a lithium-silicon negative electrode, the battery is provided. The battery includes a positive electrode; the lithium-silicon negative electrode, which has at least 10% of its capacity attributed to a silicon-based active material; a separator positioned between the positive and negative electrodes; and an electrolyte. The battery is operated within a voltage potential window ranging from about 0.7 V and about 0.07 V versus a lithium reference electrode.

17 Claims, 8 Drawing Sheets

(56) References Cited

U.S. PATENT DOCUMENTS

| | | | |
|---|---|---|---|
| 9,362,551 B2 | 6/2016 | Sachdev et al. | |
| 9,362,552 B2 | 6/2016 | Sohn et al. | |
| 9,379,374 B2 | 6/2016 | Liu et al. | |
| 9,583,767 B2 | 2/2017 | Verbrugge et al. | |
| 2006/0141359 A1* | 6/2006 | Yanagida | H01M 4/134 429/218.1 |
| 2008/0311464 A1* | 12/2008 | Krause | H01M 4/382 429/50 |
| 2012/0100403 A1 | 4/2012 | Wang et al. | |
| 2012/0229096 A1 | 9/2012 | Nazri | |
| 2012/0328927 A1 | 12/2012 | Timmons et al. | |
| 2013/0099159 A1 | 4/2013 | Halalay et al. | |
| 2013/0130115 A1* | 5/2013 | Park | H01M 4/133 429/231.8 |
| 2017/0098817 A1 | 4/2017 | Yu et al. | |

* cited by examiner

BATTERY LIFE BY CONTROLLING THE VOLTAGE WINDOW OF THE NEGATIVE ELECTRODE

BACKGROUND

Secondary, or rechargeable, lithium ion batteries are often used in many stationary and portable devices, such as those encountered in the consumer electronic, automobile, and aerospace industries. The lithium ion class of batteries has gained popularity for various reasons, including a relatively high energy density, a general nonappearance of any memory effect when compared with other kinds of rechargeable batteries, a relatively low internal resistance, a low self-discharge rate when not in use, and an ability to be formed into a wide variety of shapes (e.g., prismatic) and sizes so as to efficiently fill available space in electric vehicles, cellular phones, and other electronic devices. In addition, the ability of lithium ion batteries to undergo repeated power cycling over their useful lifetimes makes them an attractive and dependable power source.

SUMMARY

In an example of a method for improving a life cycle of a battery containing a lithium-silicon negative electrode, the battery is provided. The battery includes a positive electrode; the lithium-silicon negative electrode, which has at least 10% of its capacity attributed to a silicon-based active material; a separator positioned between the positive and negative electrodes; and an electrolyte. The battery is operated within a voltage potential window ranging from about 0.7 V and about 0.07 V versus a lithium reference electrode.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The high theoretical capacity (e.g., about 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 400%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

In the examples of the method disclosed herein, batteries containing lithium-silicon negative electrodes are operated within particular voltage potential windows that are narrower than a full potential range of 1.2 V to 0.05 V versus a lithium electrode. By controlling the voltage potential within the windows disclosed herein, it has been found that the percentage of the theoretical capacity of the silicon that is being used can be controlled. Utilizing 100% of silicon's capacity can lead to relatively rapid capacity degradation and poor life cycling. At the narrower voltage potential windows disclosed herein, less than 100% of silicon's capacity is utilized. For example, the capacity of the silicon being used may range from about 40% to about 60% of the total theoretical capacity of silicon. Also at these narrower voltage potential windows, it has been found that high capacity is maintained during cycling and capacity degradation is mitigated during cycling. The identified voltage windows versus Li+/Li are suitable for any lithium-silicon negative electrode. The voltage windows disclosed herein balance the capacity and the life cycle of the battery, which may contain any lithium-silicon within the negative electrode.

In the narrower voltage potential windows disclosed herein, the battery exhibits stability, suitable capacity, and/or smaller changes in stress of the lithium-silicon negative electrode (leading to less mechanical degradation and longer life cycle) than the battery operated at the full potential window.

Figure 1:
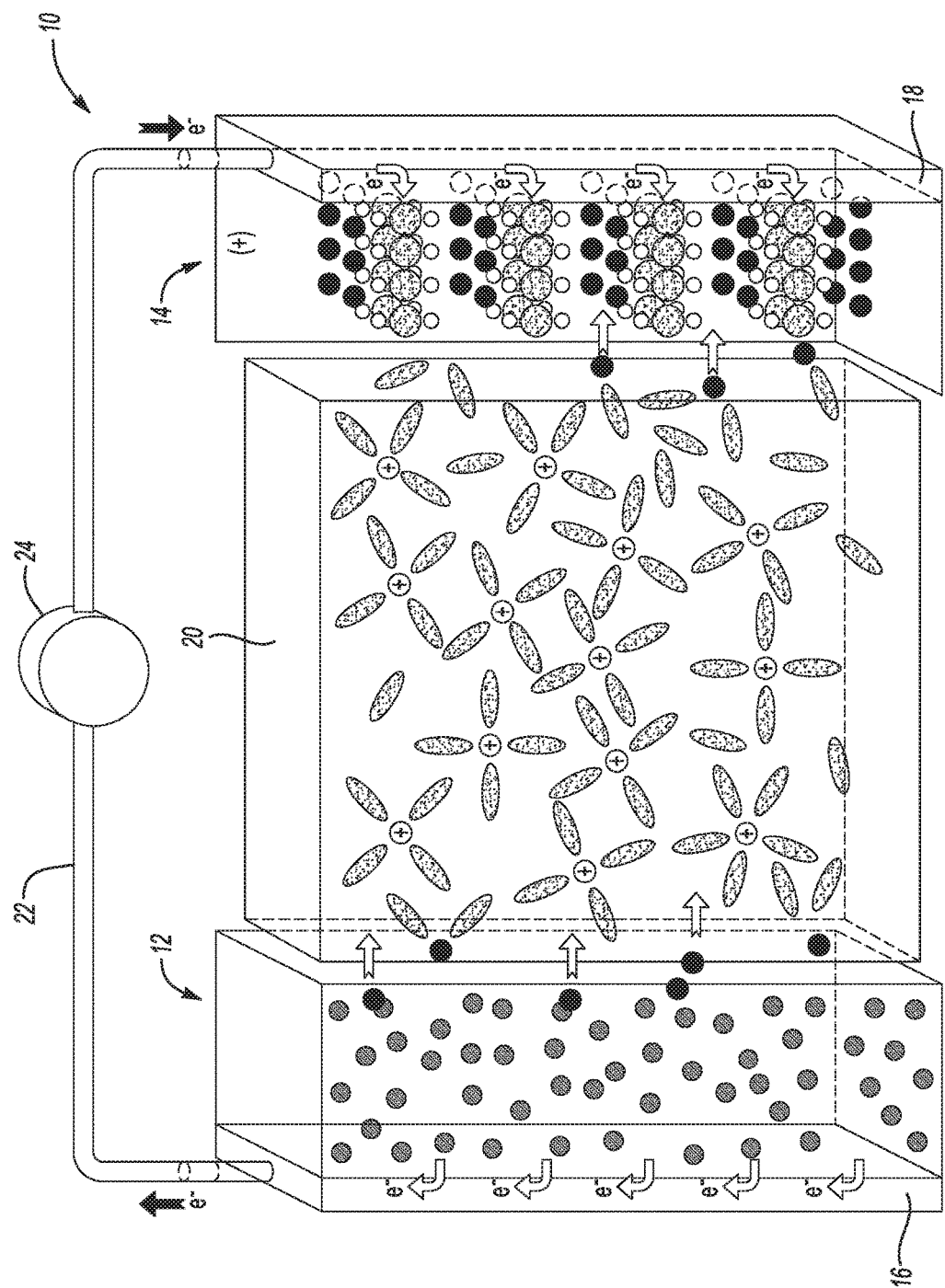
FIG. 1 is a schematic diagram of an example of a lithium ion battery during a discharge cycle.

An example of the lithium ion battery 10 is shown in FIG. 1. The battery 10 includes the lithium-silicon negative electrode 12, a positive electrode 14, respective current collectors 16, 18 in contact with each of the electrodes 12, 14, a separator 20 positioned between the electrodes 12, 14, and an electrolyte soaking at least the electrodes 12, 14 and the separator 20. While not shown, it is to be understood that the fully assembled battery 10 may be disposed in a casing (e.g., metal or a pouch).

As used herein, the term "lithium-silicon negative electrode" means any negative electrode having at least 10% of its capacity attributed to silicon, and being capable of having lithium ions inserted therein and extracted therefrom during cycling. In other words, at least 10% of the negative electrode's capacity is from silicon. The percentage of capacity attributable to silicon is based on the mass and the specific capacity of silicon. For example, assuming 4000 mAh/g for Si, and weight "W" in grams "g" of Si, and weight "X" in grams "g" of all other active species at Y mAh/g, the equation for the negative electrode's capacity is:

$$\text{(Capacity mAh/g)} = (4000 \text{ mAh/g Si})(W \text{ g Si}) + (X \text{ g})(Y \text{ mAh/g other species})$$

where the total g of active material is W+X.

The lithium may be initially introduced into the negative electrode during pre-lithiation of the negative electrode (i.e., before the negative electrode is incorporated into the battery), or it may be introduced into the negative electrode from the positive electrode during battery charging. The negative electrode may also have other percentages of its capacity attributed to silicon. For example, from about 40% to about 60% of the negative electrode's capacity may be attributed to silicon.

The lithium-silicon negative electrode 12 includes a silicon-based active material present in an amount such that at least at least 10% of the electrode's capacity is attributed to the silicon-based active material. The silicon-based active material may be crystalline silicon, amorphous silicon, silicon oxide ($SiO_x$, x<0<2), silicon alloys (e.g., Si—Sn), etc. The silicon-based active material may be in the form of a powder, particles, etc. ranging from nano-size (1 nm to 1000 nm) to micro-size (1 μm to 20 μm).

In some instances, the negative electrode 12 includes the silicon-based material alone (i.e., 100 wt % of the silicon-based material). For examples, the negative electrode 12 may be a thin-film of the silicon-based material having a thickness ranging from about 50 nm to about 50 μm. In these examples, the negative electrode 12 does not include any other active material or any other additives (e.g., binder(s), conductive filler(s), etc.). The porosity of these thin-film negative electrodes is at or near zero (i.e., porosity is 1%), and thus these thin-films are non-porous.

In other instances, the negative electrode 12 includes the silicon-based material in combination with a binder and a conductive filler. The binder may be used to structurally hold the silicon-based active material together. Examples of the binder include polyvinylidene fluoride (PVdF), polyethylene oxide (PEO), ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, lithium polyacrylate (LiPAA), cross-linked lithiated polyacrylate, polyimide, or any other suitable binder material. Other suitable binders may include polyvinyl alcohol (PVA), sodium alginate, or other water-soluble binders. The conductive filler may be a conductive carbon material. The conductive carbon material may be a high surface area carbon, such as acetylene black (e.g., SUPER P® conductive carbon black from TIMCAL). The conductive filler may be included to ensure electron conduction between the silicon-based active material and the negative-side current collector 16.

An example of this type of the negative electrode 12 may include the silicon-based active material in an amount ranging from 10 wt % to about 98 wt % of a total wt % of the negative electrode 12, the binder in an amount ranging from about 5 wt % to about 20 wt %, and the conductive filler in an amount ranging from about 5 wt % to about 20 wt %. These examples of the negative electrode 12 may also include various other functional additives (e.g., viscosity modifying agents, etc.). This type of negative electrode 12 may be porous and may have a thickness of 20 μm or greater.

In still other instances, the negative electrode 12 includes a combination of the silicon-based material with another active material. In these examples, the negative electrode 12 may be a thin-film of the combined active materials having a thickness ranging from about 50 nm to about 100 μm. In these examples, the negative electrode 12 includes the combined active materials without any other additives (e.g., binder(s), conductive filler(s), etc.). The porosity of these thin-film negative electrodes is at or near zero (i.e., porosity is ≤1%), and thus these thin-films are non-porous.

Examples of the other active materials that may be used in combination with the silicon-based active material include i) a carbon-based material; ii) germanium (Ge), tin (Sn), lead (Pb), antimony (Sb), bismuth (Bi), zinc (Zn), aluminum (Al), or cadmium (Cd); iii) alloys or intermetallic compounds of Ge, Sn, Pb, Sb, Bi, Zn, Al, Ti, iron (Fe), manganese (Mn), or Cd with other elements (wherein the alloys or compounds are stoichiometric or non-stoichiometric); iv) oxides, carbides, nitrides, sulfides, phosphides, selenides, or tellurides of Ge, Sn, Pb, Sb, Bi, Zn, Al, Fe, Ti, Mn, Co, or Cd, or mixtures or composites thereof; and v) any combination of i, ii, iii, and/or iv. Some specific examples of suitable carbon-based materials include carbon, meso-phase carbon, soft carbon, hard carbon, carbon black, activated carbon, natural graphite, artificial graphite, pyrolytic graphite, exfoliated graphite flakes, worm-like graphite, carbon nano-fibers, carbon nanotubes, graphene, graphene oxide, graphene fluoride, carbon fibers, graphite fibers, graphite whiskers, and coke.

An example of this type of the negative electrode 12 may include the silicon-based active material in an amount ranging from 10 wt % to about 98 wt % of a total wt % of the negative electrode 12 and the other active material in an amount ranging from about 2 wt % to about 90 wt %. The different active materials may be mixed by high energy ball milling, melt spinning, or physical vapor deposition.

In yet further instances, the negative electrode 12 includes the silicon-based material, the other active material, the binder, and the conductive filler. Any of the previously described materials may be used. This type of negative electrode 12 may be porous and may have a thickness of 20 μm or greater.

An example of this type of the negative electrode 12 may include the silicon-based active material in an amount ranging from 10 wt % to about 90 wt % of a total wt % of the negative electrode 12, the other active material in an amount ranging from about 5 wt % to about 80 wt %, the binder in an amount ranging from about 5 wt % to about 20 wt %, and the conductive filler in an amount ranging from about 5 wt % to about 20 wt %. These examples of the negative electrode 12 may also include various other functional additives (e.g., conductive additives, etc.).

The negative-side current collector 18 may be formed of an electrically conductive material, such as a copper foil or another metal that can function as the negative terminal of the battery 10.

The positive electrode 14 includes any lithium-based active material that can sufficiently undergo lithium insertion and deinsertion while aluminum or another suitable current collector 18 is functioning as the positive terminal of the battery 10. Examples of the lithium-based active material include spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable examples of lithium-based active material include $Li(Ni_{1/3}Mn_{1/3}Co_{1/3})O_2$, $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$), or a lithium rich layer-structure. Still other lithium-based active materials may also be utilized for the positive electrode 14, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg) (an example of which includes $LiMn_{1.5}Ni_{0.5}O_4$ or $LiMNO_4$), stabilized lithium manganese oxide spinel ($Li_xMn_{2-y}M_yO_4$, where M is composed of any ratio of Al, Ti, Cr, Ni, Co, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_4SiO_4$, $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal-based active material to stabilize the crystal structure. For example, any O atom may be substituted with an F atom.

The positive electrode 14 may also include any of the binders and/or conductive fillers and/or other additives previously described. In an example, the positive electrode 14 may include up to 98% by total weight (i.e., 98 wt %) of the active material, from about 0 wt % to about 20 wt % of the conductive filler, from about 0 wt % to about 20 wt % of the binder and from about 0 wt % to about 20 wt % of other additives.

The positive-side current collector 18 may be formed of an electrically conductive material, such as aluminum or another metal that can function as the positive terminal of the battery 10.

In the examples disclosed herein, the thickness of the thin-film negative electrode 12 and/or the mass loading of the silicon in the thicker, porous negative electrode 12 may be determined by the capacity of the positive electrode 14, using the N/P ratio. The N/P ratio is the negative-to-positive capacity ratio or the areal capacity ratio of negative to positive electrodes. In an example, the N/P ratio of the battery 10 ranges from 1.025 to 3. In an example, the N/P ratio of the battery 10 ranges from 1.5 to 2.5.

The porous polymer separator 20 of the battery 10 operates as an electrical insulator (preventing the occurrence of a short), a mechanical support, and a barrier to prevent physical contact between the two electrodes 12, 14. The porous polymer separator 20 also ensures passage of lithium ions (not shown) through an electrolyte (not shown) filling its pores.

The porous polymer separator 20 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer separators 16 include single layer polypropylene membranes, such as CELGARD 2400 and CELGARD 2500 from Celgard, LLC (Charlotte, N.C.). It is to be understood that the porous polymer separator 16 may be coated or treated, or uncoated or untreated. For example, the porous polymer separator 16 may or may not be coated or include any surfactant treatment or ceramic particles thereon.

In other examples, the porous polymer separator 20 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous polymer separator 16 is poly(p-hydroxybenzoic acid). In yet another example, the porous polymer separator 16 may be chosen from a combination of the polyolefin (such as PE and/or PP) and one or more of the other polymers listed above.

The porous polymer separator 20 may be a single layer or may be a multi-layer (e.g., bilayer, trilayer, etc.) laminate fabricated from either a dry or wet process.

The electrolyte of the battery 10 may be a liquid, gel, or polymer electrolyte. In an example, the electrolyte includes an organic solvent and a lithium salt dissolved in the organic solvent. Examples of the organic solvent include cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof. For example, the electrolyte may be a mixture of ethylene carbonate, dimethyl carbonate, and diethyl carbonate. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiNO_3$, $LiPF_3(CF_3)_3$, $LiSO_3CF_3$, and mixtures thereof. The concentration of the salt in the electrolyte may be about 1 mol/L. $LiNO_3$ and/or fluoroethylene carbonate (FEC) may also be added to the electrolyte as an additive. In an example, the concentration of the lithium salt may be about 0.6 mol/L plus the $LiNO_3$ additive. In another example, the concentration of the lithium salt may be about 1 mol/L plus 10 wt. % of the FEC additive. Any suitable polymer electrode may be used, examples of which include poly(ethylene oxide) (PEO) or PEO-PS (polystyrene) block co-polymers.

As shown in FIG. 1, the fully assembled battery 10 may also include an external circuit 22 that connects the current collectors 16, 18. The battery 10 may also support the load device 24 that can be operatively connected to the external circuit 22. The load device 24 may receive a feed of electrical energy from the electric current passing through the external circuit 22 when the battery 10 is discharging. While the load device 24 may be any number of known electrically-powered devices, a few specific examples of a power-consuming load device include an electric motor for a hybrid vehicle or an all-electrical vehicle, a laptop computer, a cellular phone, and a cordless power tool. The load device 24 may also, however, be a power-generating apparatus that charges the battery 10 for purposes of storing energy. For instance, the tendency of windmills and solar panels to variably and/or intermittently generate electricity often results in a need to store surplus energy for later use.

Examples of the method for improving a life cycle of a battery 10 containing a lithium silicon negative electrode 12 include providing the battery 10, and operating the battery 10 within a voltage potential window ranging from about 0.7 V to about 0.07 V versus a lithium reference electrode. In an example, the lithium metal is used as both the counter electrode and reference electrode (i.e., in place of the positive electrode 14). In other examples, the battery 10 is a three electrode system which includes an additional lithium reference electrode (not shown).

Three different voltage potential windows may be utilized. In one example, during battery operation, the voltage potential window is controlled to be within a range of about 0.6371 V to about 0.1871 V versus the lithium reference electrode. In another example, during battery operation, the voltage potential window is controlled to be within a range of about 0.5526 V to about 0.1331 V versus the lithium reference electrode. In still another example, during battery operation, the voltage potential window is controlled to be within a range of about 0.4650 V to about 0.0763 V versus the lithium reference electrode. At each of these voltage potential windows, it is believed that any of the negative electrodes 12 disclosed herein may yield capacities and have life cycles suitable for a variety of applications.

At the beginning of a discharge, the negative electrode 12 of the battery 10 contains a high concentration of inserted lithium while the positive electrode 14 is relatively depleted. When the negative electrode 12 contains a sufficiently higher relative quantity of inserted lithium, the battery 10 can generate a beneficial electric current by way of reversible electrochemical reactions that occur when the external circuit 22 is closed to connect the negative electrode 12 and the positive electrode 14. The establishment of the closed external circuit under such circumstances causes the extraction of inserted lithium from the negative electrode 12. The extracted lithium atoms are split into lithium ions (identified by the black dots and by the open circles having a (+) charge) and electrons ($e^-$) as they leave the insertion host (i.e., the lithium-silicon negative electrode 12).

The chemical potential difference between the electrodes 12, 14 drives the electrons ($e^-$) produced by the oxidation of inserted lithium at the negative electrode 12 through the external circuit 22 towards the positive electrode 14. The lithium ions are concurrently carried by the electrolyte through the porous polymer separator 20 towards the positive electrode 14. The different voltage potential windows disclosed herein may be used to control the amount of lithium that is transported during cycling.

The electrons ($e^-$) flowing through the external circuit 22 and the lithium ions migrating across the porous polymer separator 20 in the electrolyte eventually reconcile and form intercalated lithium at the positive electrode 14. The electric current passing through the external circuit 22 can be harnessed and directed through the load device 24 until the level of lithium in the negative electrode 12 falls below a workable level or the need for electrical energy ceases.

The battery 10 may be recharged after a partial or full discharge of its available capacity. To charge the battery 10, an external battery charger is connected to the positive and the negative electrodes 14, 12, to drive the reverse of battery discharge electrochemical reactions. During recharging, the electrons ($e^-$) flow back toward the negative electrode 12 through the external circuit 22, and the lithium ions are carried by the electrolyte across the porous polymer separator 20 back toward the negative electrode 12. The electrons ($e^-$) and the lithium ions are reunited at the negative electrode 12, thus replenishing it with inserted lithium for consumption during the next battery discharge cycle.

The external battery charger that may be used to charge the battery 10 may vary depending on the size, construction, and particular end-use of the battery 10. Some suitable external battery chargers include a battery charger plugged into an AC wall outlet and a motor vehicle alternator.

When non-porous thin-film (i.e., thickness ranging from about 50 nm to about 50 μm or to about 100 μm) lithium-silicon negative electrodes 12 are utilized, the voltage potential windows disclosed herein may be used during battery operation and may contribute to several desirable battery characteristics. For example, high volumetric energy density can be achieved, since there are no non-active materials (such as polymer binder, conductive additives) and the porosity is zero or near zero. Additionally, the thickness of thin-film electrodes disclosed herein is around $1/10^{th}$ to $1/20^{th}$ of the conventional porous electrode with the same areal capacity. For another example, the stress amplitude of the thin-film lithium-silicon negative electrode 12 may be maintained from about −0.5 GPa to about 0.3 GPa during battery operation. These small stress changes may lead to much less mechanical degradation of the electrode 12, thus extending the life cycle. For still another example, the capacity of the thin-film lithium-silicon negative electrode 12 may be about 1.0 mAh/cm² or greater over at least 10 cycles.

When thicker (i.e., thickness greater than 20 μm), porous lithium-silicon negative electrodes 12 are utilized, the voltage potential windows disclosed herein may be used during battery operation, and may contribute to several desirable battery characteristics. For example, the stress amplitude of the thicker, porous lithium-silicon negative electrode 12 may be maintained at a small range, ideally negative, during battery operation, which may reduce mechanical degradation of the electrode 12, thus extending the life cycle.

Examples of the method for conditioning a negative electrode include incorporating a silicon film having a thickness ranging from about 50 nm to about 50 μm into a battery 10 as the negative electrode 12, such that the separator 20 is positioned between the silicon film (in this example, negative electrode 12) and a positive electrode 14. The battery 10 is soaked in the electrolyte disclosed herein, and then is operated within the voltage potential window ranging from about 0.7 V and about 0.07 V versus a lithium reference electrode (which may be a counter/reference electrode in place of the positive electrode 14 or may be a third electrode in the system). The initial cycle is to condition the negative electrode 12 with a compressive state, and the negative electrode 12 retains the compressive stress state during subsequent battery cycles operating within the voltage potential window.

The battery 10 disclosed herein may be referred to as a lithium-silicon battery, in part because it includes the lithium-silicon negative electrodes (or silicon enhanced electrodes).

To further illustrate the present disclosure, examples are given herein. It is to be understood that these examples are provided for illustrative purposes and are not to be construed as limiting the scope of the present disclosure.

Example 1

Thin-film silicon negative electrodes were prepared using RF (radio frequency) magnetron sputtering on rough copper coils. The thickness of the negative electrodes was controlled to 2 μm. The negative electrodes were incorporated into coin cells (CR2032) with a polymer separator and a lithium counter/reference electrode. The electrolyte was ethylene carbonate (EC):diethyl carbonate (DEC) (1:1) with 10 wt. % fluoroethylene carbonate (FEC) and 1M $LiPF_6$.

Figure 2A:
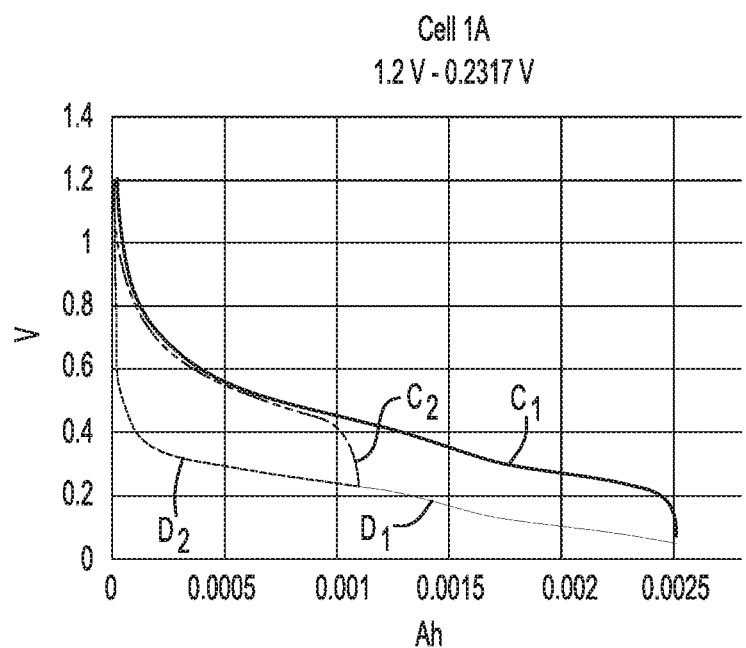
FIGS. 2A through 2E are graphs depicting the voltage (V) versus capacity (Ah) for coin cells including a lithium-silicon thin-film negative electrode (thickness 2 µm) and a lithium counter/reference electrode, where each graph illustrates charge and discharge curves for the cell operated at a full potential window and at respective preset potential windows.
Figure 2B:
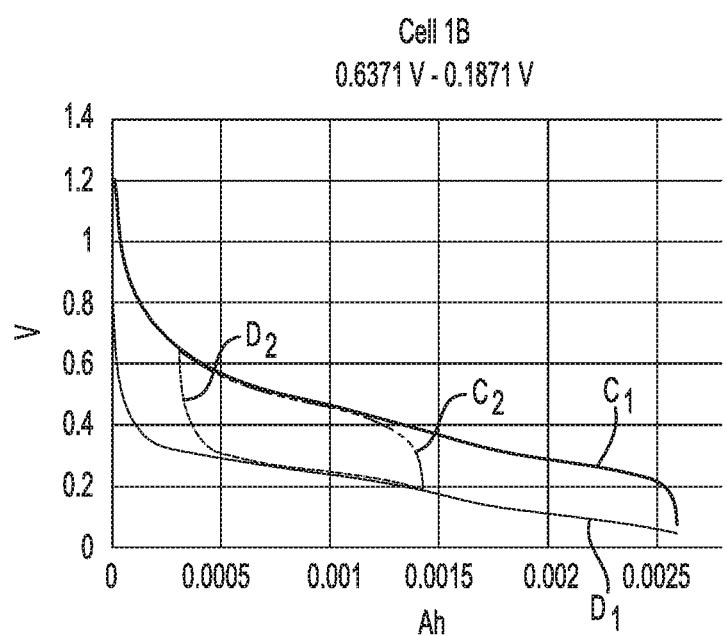
Figure 2C:
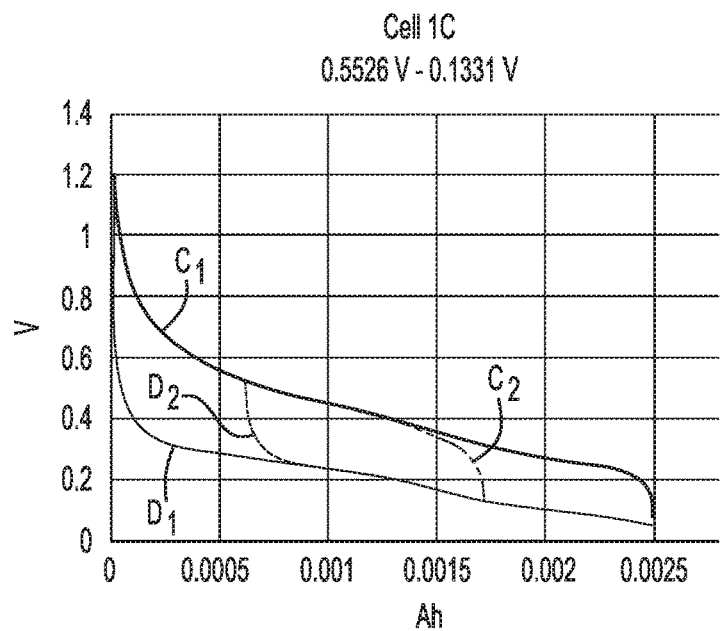
Figure 2D:
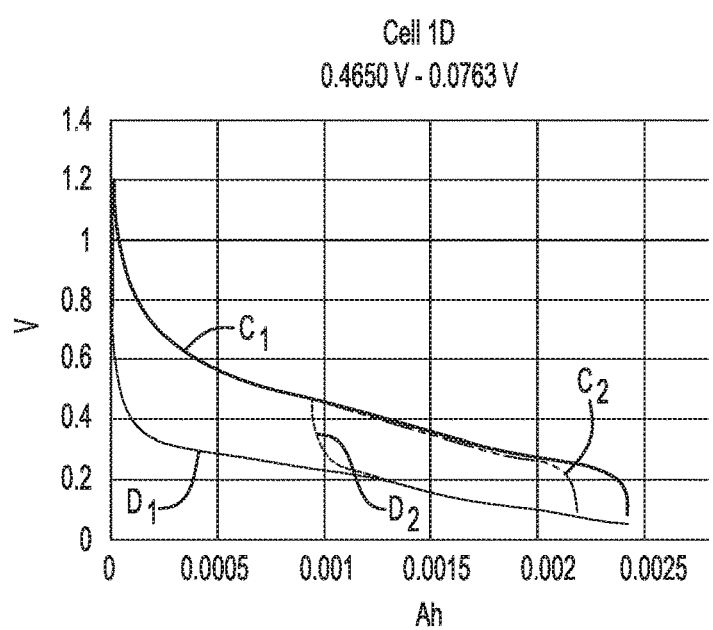
Figure 2E:
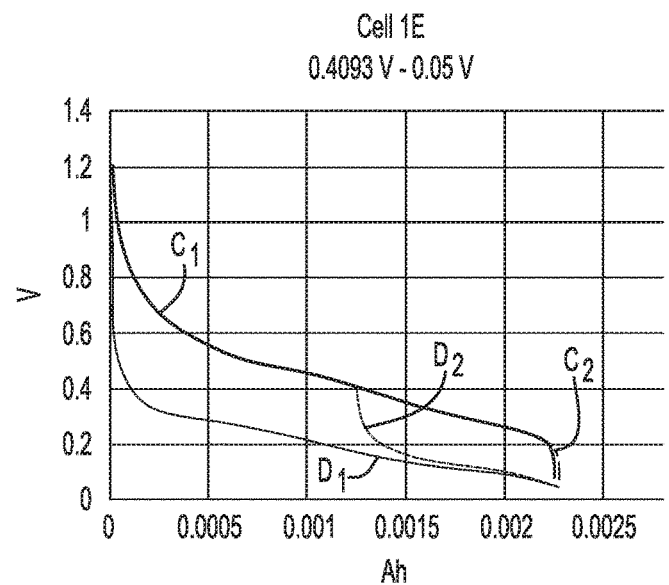

The cells were exposed to Galvanostatic cycling (at 25° C.), with C-rates of approximately C/5 if based on the half capacity, and approximately C/10 if based on the full capacity. For each cell, charge ($C_1$) and discharge ($D_1$) cycles were performed at a full potential window (between 1.2 V and 0.05 V), followed by charge ($C_2$) and discharge ($D_2$) cycles within one of five different preset voltage potential windows. Cell 1A (comparative example 1, representing a typical silicon negative electrode operating voltage) was cycled at a preset voltage potential window ranging from 1.2 V to 0.2317 V. The voltage (V, Y-axis) versus capacity (Ah, X-axis) results for Cell 1A at the full potential window and the preset potential window are shown in FIG. 2A. Cell 1B (example 2) was cycled at a preset voltage potential window ranging from 0.6371 V to 0.1871 V. The voltage (V, Y-axis) versus capacity (Ah, X-axis) results for Cell 1B at the full potential window and the preset potential window are shown in FIG. 2B. Cell 1C (example 3) was cycled at a preset voltage potential window ranging from 0.5526 V to 0.1331 V. The voltage (V, Y-axis) versus capacity (Ah, X-axis)

results for Cell 1C at the full potential window and the preset potential window are shown in FIG. 2C. Cell 1D (example 4) was cycled at a preset voltage potential window ranging from 0.4650 V to 0.0763 V. The voltage (V, Y-axis) versus capacity (Ah, X-axis) results for Cell 1D at the full potential window and the preset potential window are shown in FIG. 2D. Cell 1E (comparative example 5) was cycled at a preset voltage potential window ranging from 0.4093 V to 0.05 V. The voltage (V, Y-axis) versus capacity (Ah, X-axis) results for Cell 1E at the full potential window and the preset potential window are shown in FIG. 2E.

Figure 3A:
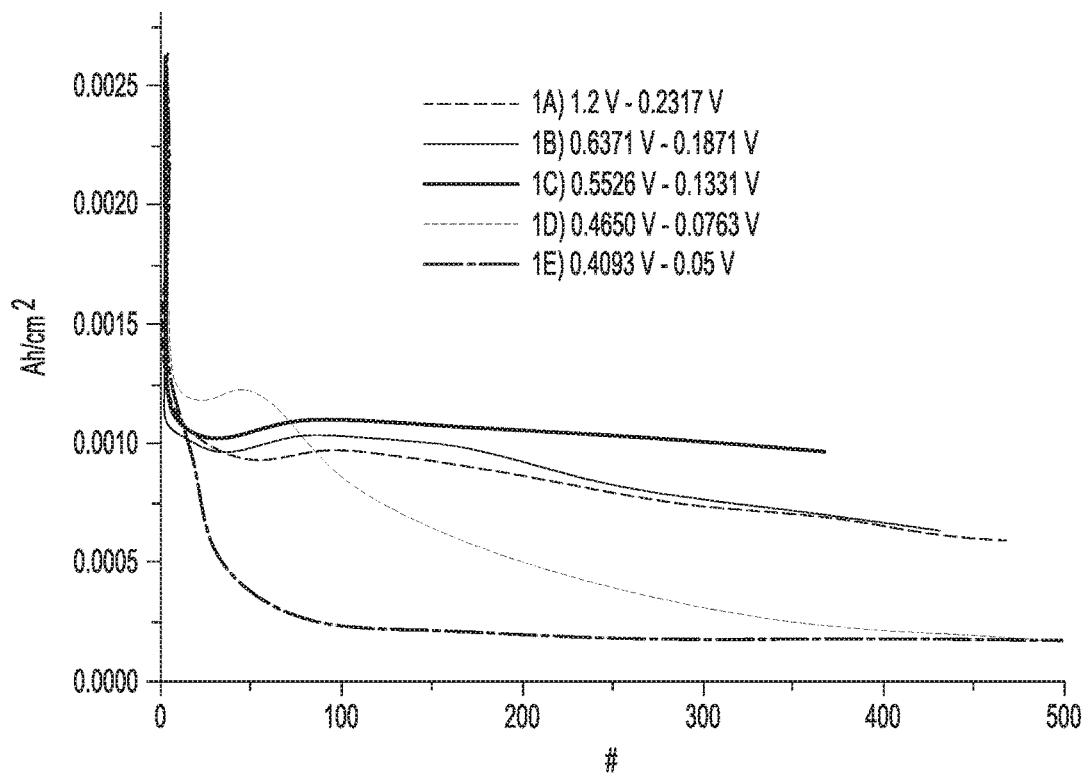
FIG. 3A is a graph depicting the capacity (Ah/cm$^2$) versus cycle number (#) for the coin cells including the lithium-silicon thin-film negative electrode (thickness 2 µm) and the lithium counter/reference electrode operated at the preset potential windows.

FIG. 3A illustrates the capacity (Ah/cm², Y-axis) versus cycle number (#, X-axis) for each of Cells 1A through 1E. As noted above, Cell 1A represents the typical operating voltage. As illustrated in FIG. 3A, Cells 1B through 1D, which were operated at the voltage potential windows disclosed herein, exhibited comparable or better capacity than Cell 1A through about 80 cycles. Cells 1B and 1C exhibited comparable or better capacity than Cell 1A through about 350 cycles, and also exhibited stability. The capacity of cells 1B, 1C, and 1D was greater than 1.0 mAh/cm² for at least 10 cycles.

The low voltage potential windows of Cells 1B and 1C yields a higher energy density (energy density=capacity*voltage) when compared to Cell 1A when they are assembled into the full cell due to large potential difference between the positive and negative electrodes.

Figure 3B:
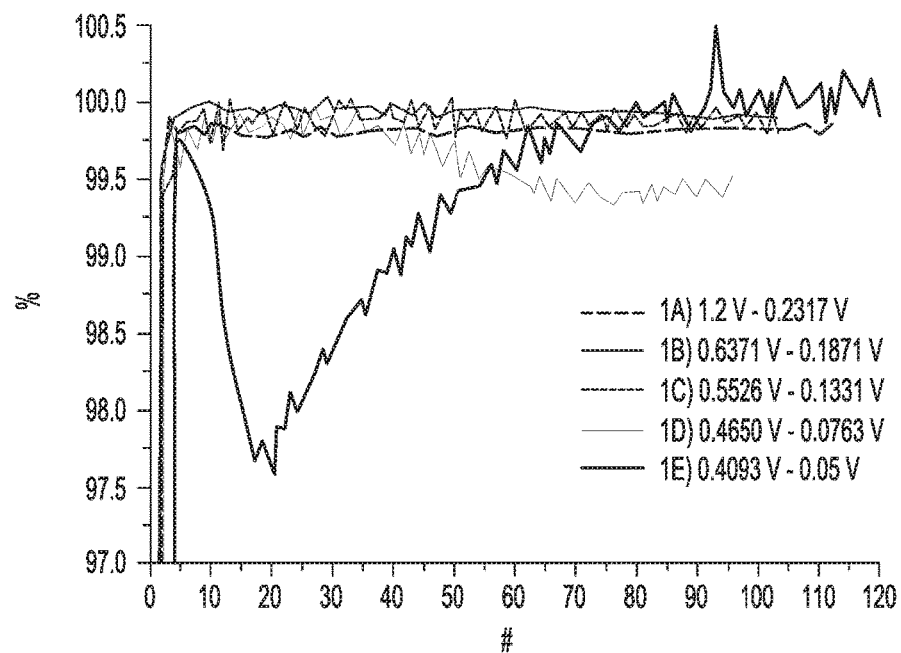
FIG. 3B is a graph depicting the Coulombic efficiency (%) versus cycle number (#) for the coin cells including the lithium-silicon thin-film negative electrode (thickness 2 µm) and the lithium counter/reference electrode operated at the preset potential windows.

FIG. 3B illustrates the Coulombic efficiency (%, Y-axis) versus cycle number (#, X-axis) for each of Cells 1A through 1E. As noted above, Cell 1A represents the typical operating voltage. As illustrated in FIG. 3B, Cells 1B through 1D, which were operated at the voltage potential windows disclosed herein, exhibited comparable or better Coulombic efficiency than Cell 1A through about 40 cycles. Cells 1B and 1C exhibited comparable or better Coulombic efficiency than Cell 1A through about 100 cycles, and also exhibited stability.

Figure 4:
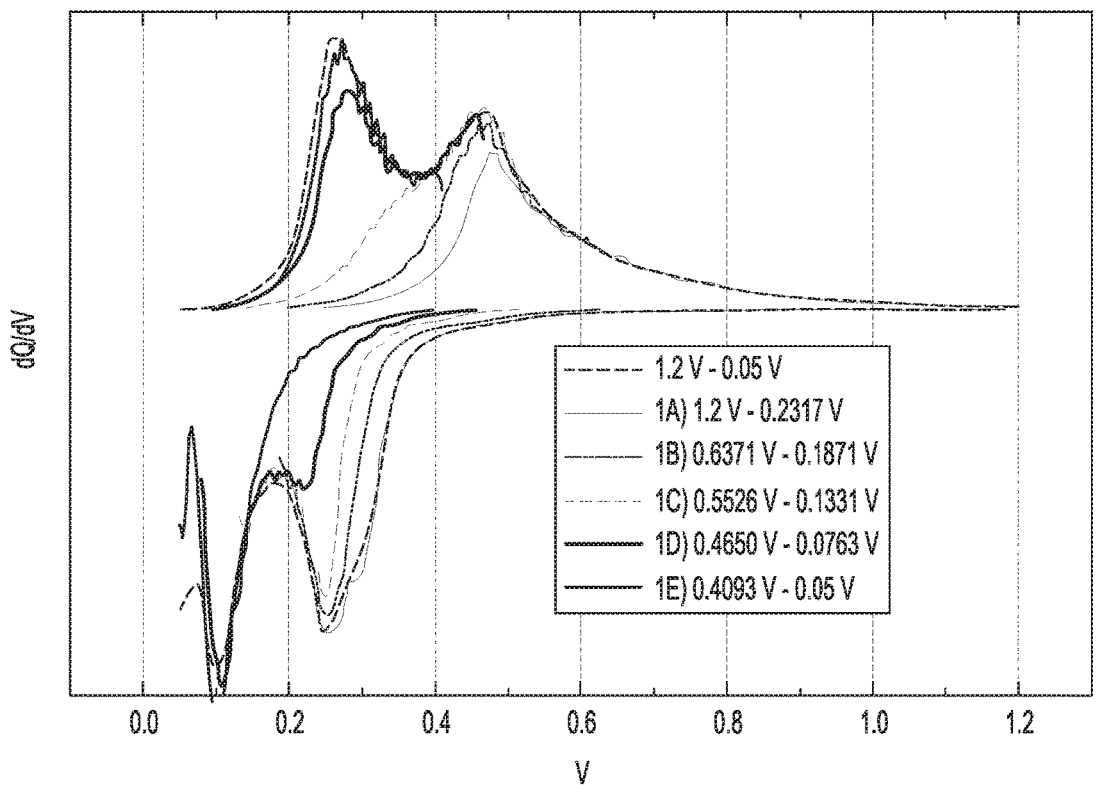
FIG. 4 is a graph depicting the differential capacity (dQ/dV) versus voltage (V) for the coin cells including the lithium-silicon thin-film negative electrode (thickness 2 µm) and the lithium counter/reference electrode operated at the full potential window and at the preset potential windows.

FIG. 4 illustrates the differential capacity (dQ/dV, Y-axis) versus the voltage (V, X-axis) for a cell run at the full potential window and for each of Cells 1A through 1E at their respective preset voltage potential windows. An electrochemist reviewing these results would likely conclude that the preset voltage window of Cells 1A, 1B, 1C would be most suitable, in part because they only have one pair of redox peaks, indicating less phase-transformation or abrupt structural changes. However, both Cells 1B and 1C have lower average operating potential compared with Cell 1A. This, coupled with the capacity, efficiency data, and energy density illustrate that the voltage potential windows for Cells 1B and 1C are most suitable for silicon-based electrodes.

Example 2

In this example, during the cycling, in situ multi-beam optical stress sensor measurements were obtained. The x in $Li_xSi$ was determined based on the state of charge.

Thin-film silicon negative electrodes were prepared using RF (radio frequency) magnetron sputtering on sapphire disks with a titanium interlayer as the current collector. The thickness of the negative electrodes was controlled to 100 nm. The negative electrodes were incorporated into customized electrochemical cells with a polymer separator and a lithium counter/reference electrode. The electrolyte was ethylene carbonate (EC):diethyl carbonate (DEC) (1:1) with 10 wt. % fluoroethylene carbonate (FEC) and 1M $LiPF_6$.

The cells were exposed to Galvanostatic cycling (at 25° C.), with C-rates of approximately C/5 if based on the half capacity, and approximately C/10 if based on the full capacity. One cell was exposed to the full potential window, and the other 5 cells were exposed to the preset voltage potential windows. In this example, Cell 2A (comparative example 6, representing a typical silicon negative electrode operating voltage) was cycled at a preset voltage potential window ranging from 1.2 V to 0.2317 V; Cell 2B (example 7) was cycled at a preset voltage potential window ranging from 0.6371 V to 0.1871 V; Cell 2C (example 8) was cycled at a preset voltage potential window ranging from 0.5526 V to 0.1331 V; Cell 2D (example 9) was cycled at a preset voltage potential window ranging from 0.4650 V to 0.0763 V; and Cell 2E (comparative example 10) was cycled at a preset voltage potential window ranging from 0.4093 V to 0.05 V.

Figure 5:
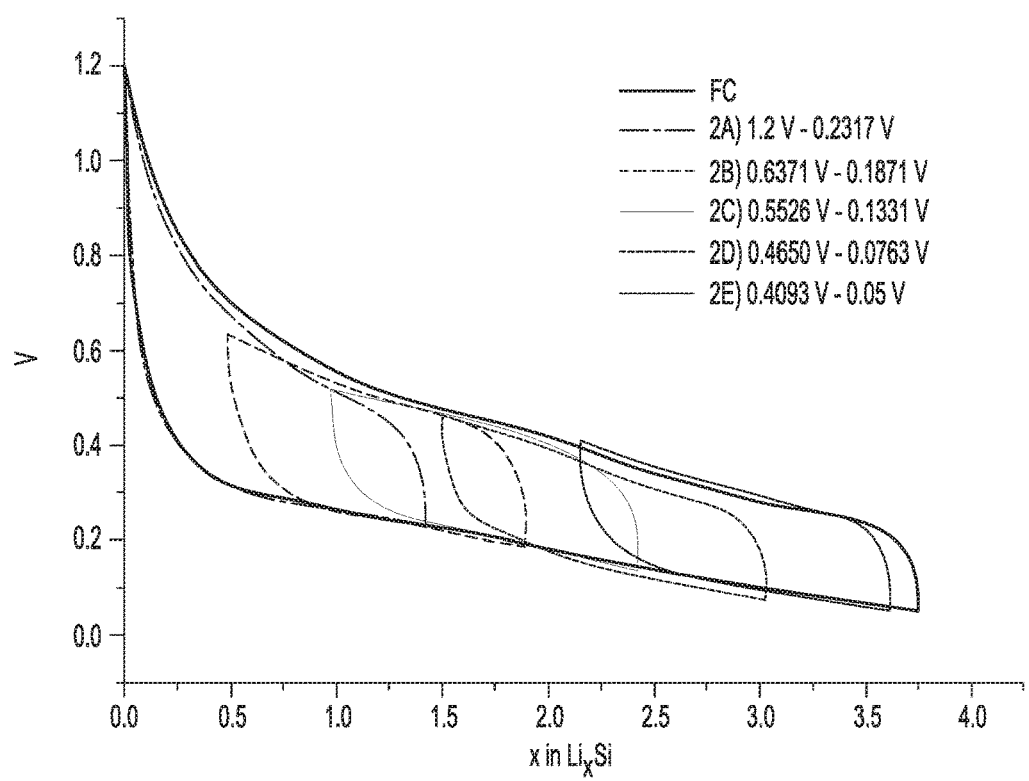
FIG. 5 is a graph depicting voltage (V) versus the lithium content (x) in $Li_xSi$ for electrochemical cells including a lithium-silicon thin-film negative electrode (thickness 100 nm) and a lithium counter/reference electrode operated at the full potential window and at the preset potential windows.
Figure 6:
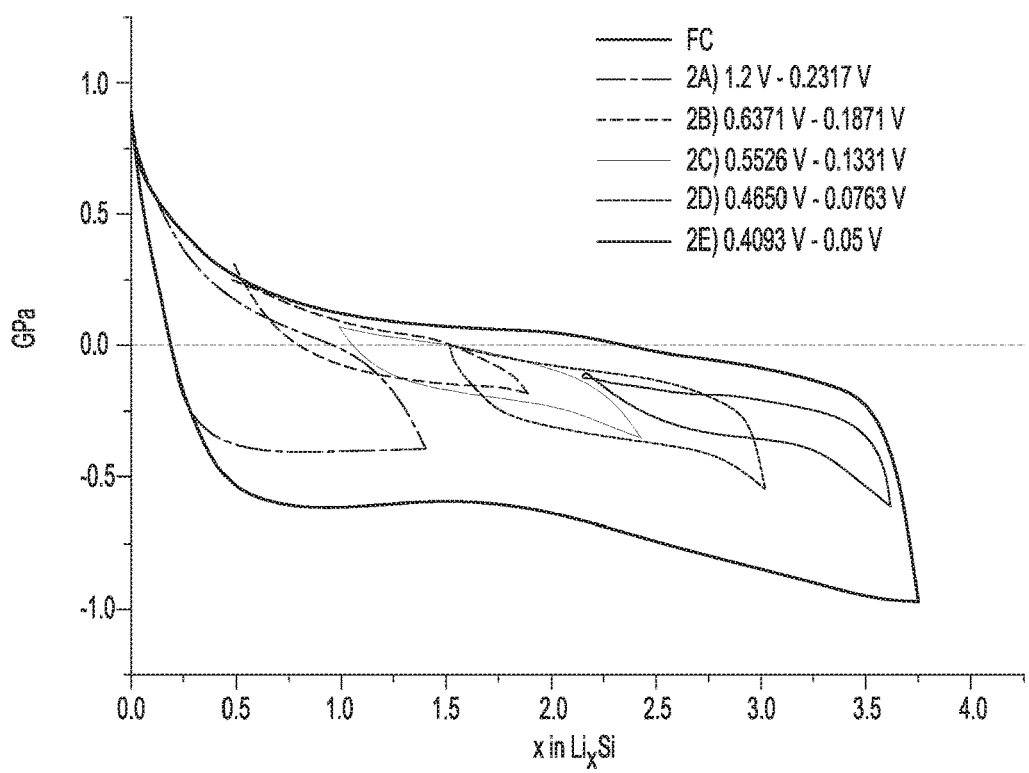
FIG. 6 is a graph depicting stress (GPa) versus the lithium content (x) in $Li_xSi$ for the electrochemical cells including the lithium-silicon thin-film negative electrode (thickness 100 nm) and the lithium counter/reference electrode operated at the full potential window and at the preset potential windows.

FIG. 5 illustrates the voltage (V, Y-axis) versus x in $Li_xSi$ (X-axis) in the negative electrodes of the various cells. FIG. 6 illustrates the stress (GPa, Y-axis) versus x in $Li_xSi$ (X-axis) in the negative electrodes of the various cells.

The low voltage potential windows of Cells 2B and 2C yields a higher energy density when compared to Cell 2A.

Cells 2B and 2C also maintain a stress amplitude near 0 GPa. Low changes in stress mean that the electrode undergoes less mechanical degradation. Additionally, the stress of cells 2C and 2D remains negative, and thus is dominantly compressive.

Discussion of Examples 1 and 2

Because the average voltage is lower for Cells 1C and 2C, for example, the environment is more reducing than that of Cells 1A and 2A. A more reducing environment would be expected to yield more solvent reduction, which would consume lithium and lead to capacity loss. From this perspective, the results in FIG. 3A may seem anomalous, but they are reproducible.

The apparently anomalous result can be understood by examining the stress within the electrode material during cycling (FIG. 6). Because the stress change and the amount of tensile stress in the lithium-silicon electrode is minimized by operating within the voltage window of Cell 2C, as compared to higher voltage window of Cell 2A, the electrode is subject to less mechanical degradation. In a full cell, including a negative electrode with lithium-silicon and a positive electrode at a much higher voltage relative to a lithium reference (e.g., a conventional nickel-manganese-cobalt oxide positive electrode that is known to be stable at about 3.7 V vs. a lithium electrode), the voltage window associated with Cells 1C and 2C is more desirable than the voltage window associated with Cells 1A and 2A, insofar as it yields a higher cell voltage, corresponding to the positive electrodes voltage minus that of the negative electrode.

Based upon the results in Examples 1 and 2, the voltage windows of Cells 1B, 2B, 1C and 1C may be desirable for achieving stable cycling (reduced capacity loss on cycling), and the voltage window of Cells 1D and 2D may be desirable for achieve high capacity in a relatively short life cycle.

Example 3

Thin-film silicon negative electrodes were prepared using RF (radio frequency) magnetron sputtering on rough copper coils. The thickness of the negative electrodes was controlled to 6 µm. The negative electrodes were incorporated into coin cells (CR2032) with a polymer separator and a lithium counter/reference electrode. The electrolyte was ethylene carbonate (EC):diethyl carbonate (DEC) (1:1) with 10 wt. % fluoroethylene carbonate (FEC) and 1M $LiPF_6$.

The cells were exposed to Galvanostatic cycling (at 25° C.), with C-rates of approximately C/5 if based on the half capacity, and approximately C/10 if based on the full capacity. The 5 cells were exposed to the preset voltage potential windows. In this example, Cell 3A (comparative example 11, representing a typical silicon negative electrode operating voltage) was cycled at a preset voltage potential window ranging from 1.2 V to 0.2317 V; Cell 3B (example 12) was cycled at a preset voltage potential window ranging from 0.6371 V to 0.1871 V; Cell 3C (example 13) was cycled at a preset voltage potential window ranging from 0.5526 V to 0.1331 V; Cell 3D (example 14) was cycled at a preset voltage potential window ranging from 0.4650 V to 0.0763 V; and Cell 3E (comparative example 15) was cycled at a preset voltage potential window ranging from 0.4093 V to 0.05 V.

Figure 7A:
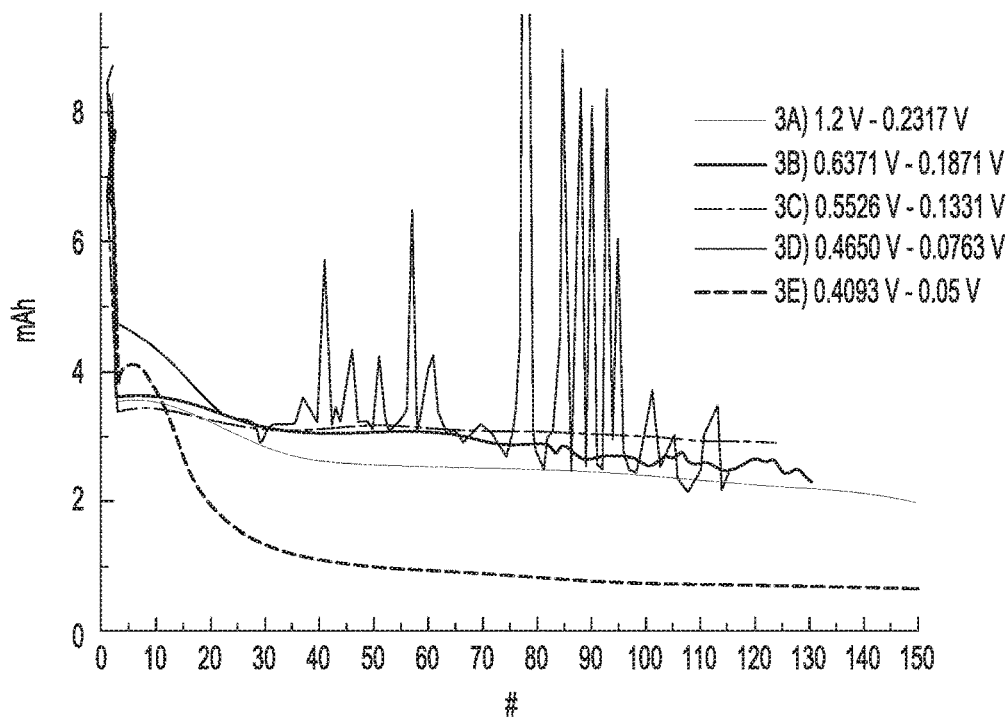
FIG. 7A is a graph depicting the capacity (mAh/cm$^2$) versus cycle number (#) for coin cells including a lithium-silicon thin-film negative electrode (thickness 6 µm) and a lithium counter/reference electrode operated at the preset potential windows.

FIG. 7A illustrates the capacity ($mAh/cm^2$, Y-axis) versus cycle number (#, X-axis) for each of Cells 3A through 3E. As noted above, Cell 3A represents the typical operating voltage. As illustrated in FIG. 7A, Cells 3B through 3D, which were operated at the voltage potential windows disclosed herein, exhibited comparable or better capacity than Cell 3A through about 110 cycles or more. Cells 3B and 3C exhibited more stability than Cell 3D.

The low voltage potential windows of Cells 3B and 3C yields a higher energy density when compared to Cell 3A.

Figure 7B:
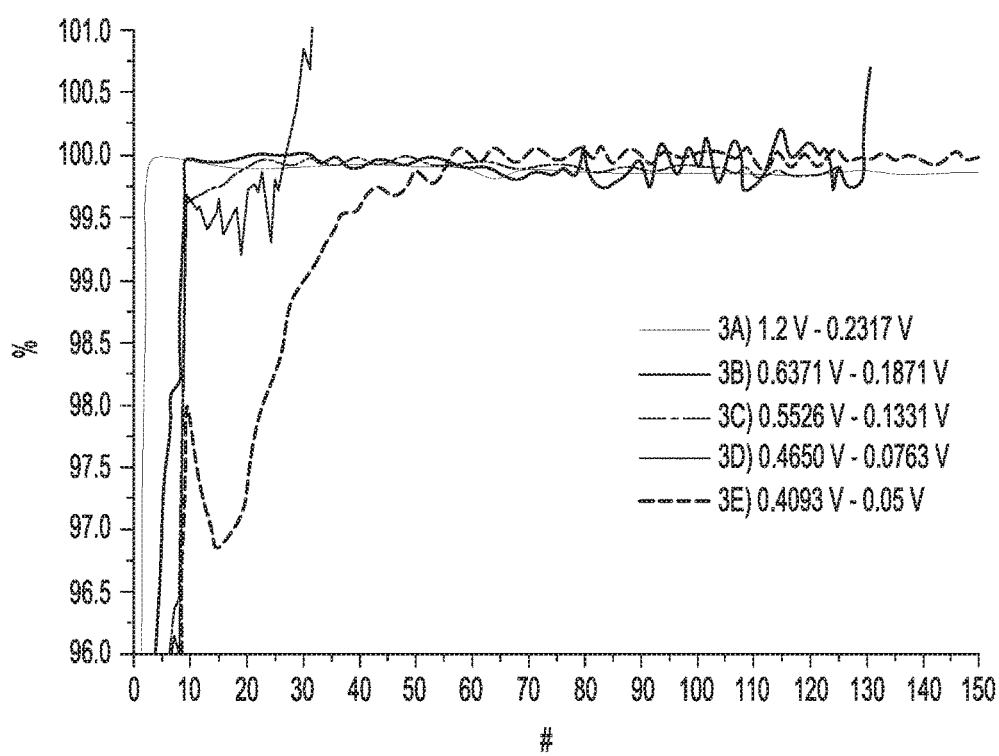
FIG. 7B is a graph depicting the Coulombic efficiency (%) versus cycle number (#) for the coin cells including the lithium-silicon thin-film negative electrode (thickness 6 µm) and the lithium counter/reference electrode operated at the preset potential windows.

FIG. 7B illustrates the Coulombic efficiency (%, Y-axis) versus cycle number (#, X-axis) for each of Cells 3A through 3E. As noted above, Cell 3A represents the typical operating voltage. As illustrated in FIG. 7B, Cells 3B and 3C, which were operated at the voltage potential windows disclosed herein, exhibited comparable or better Coulombic efficiency than Cell 3A from about 10 cycles through about 120 cycles. Cells 3B and 3C also exhibited stability.

Comparative Example 4

A thin-film silicon negative electrode was prepared using RF (radio frequency) magnetron sputtering on rough copper coils. The thickness of the negative electrodes was controlled to 4 µm. The negative electrode was incorporated into a coin cell (CR2032) with a polymer separator and a lithium counter/reference electrode. The electrolyte was ethylene carbonate (EC):diethyl carbonate (DEC) (1:1) with 10 wt. % fluoroethylene carbonate (FEC) and 1M $LiPF_6$.

The cell were exposed to Galvanostatic cycling (at 25° C.), with a C-rate of approximately C/10 based on the full capacity. The cell was exposed to the full voltage potential window (ranging from 0.05 V to about 1.5 V).

Figure 8:
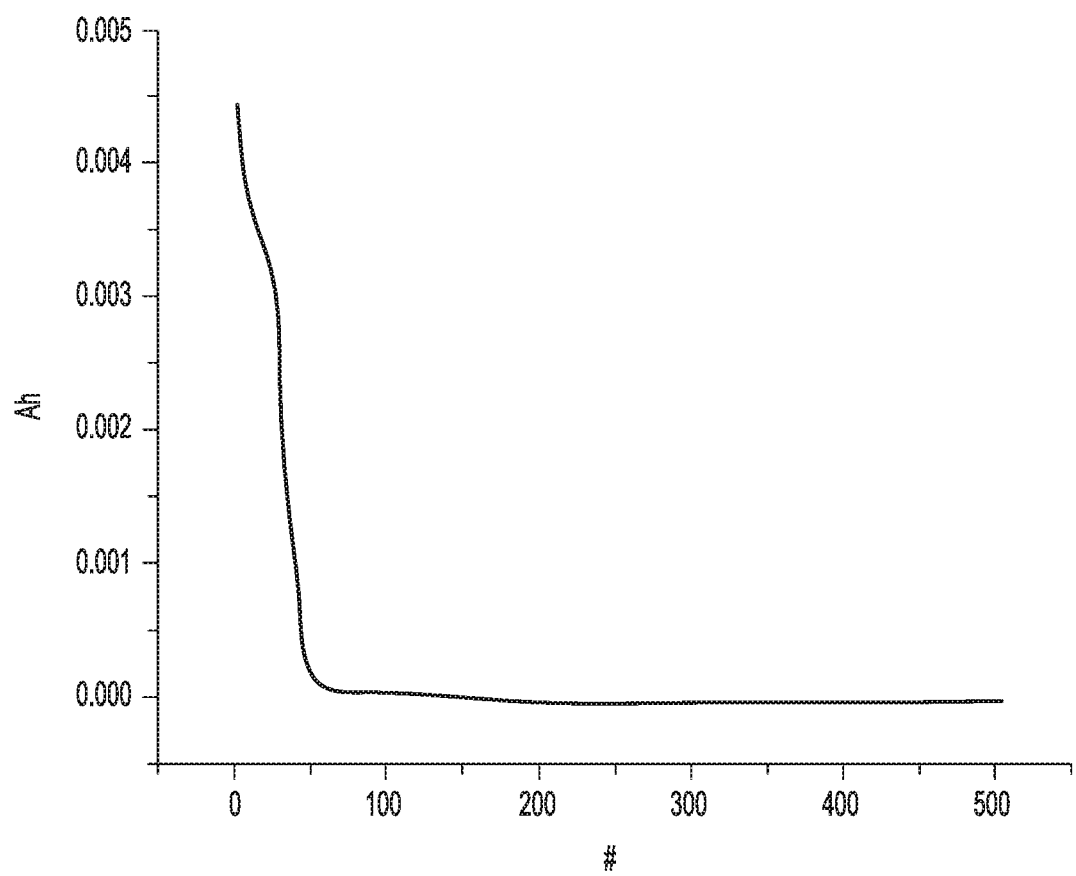
FIG. 8 is a graph depicting the capacity (Ah) versus cycle number (#) for a coin cell including a lithium-silicon thin-film negative electrode (thickness 4 µm) and a lithium counter/reference electrode operated at the full potential window.

FIG. 8 illustrates the capacity (Ah, Y-axis) versus cycle number (#, X-axis) for the cell. By operating at the full potential window, 100% of silicon's capacity is utilized, and the capacity of the negative electrode degrades quickly (in less than 50 cycles). It is believed that the same negative electrode, operated in a cell at one of the voltage potential windows associated with Cells 1B, 1C, or 1D in Example 1, would utilize a lower percentage of silicon's theoretical capacity, and thus the negative electrode capacity would be similar to those seen in FIG. 3A or 7A.

It is to be understood that the ranges provided herein include the stated range and any value or sub-range within the stated range. For example, a range of from about 50 nm to about 50 µm should be interpreted to include not only the explicitly recited limits of from about 50 nm to about 50 µm but also to include individual values, such as 100 nm, 750 nm, 5.5 µm, etc., and sub-ranges, such as from about 75 nm to about 25 µm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for improving a life cycle of a battery containing a lithium-silicon thin-film negative electrode, the method comprising:
    providing the battery, including:
        a positive electrode;
        the lithium-silicon thin-film negative electrode having at least 10% of its capacity attributed to a silicon-based active material and a thickness of less than about 50 µm;
        a separator positioned between the positive and negative electrodes; and
        an electrolyte; and
    operating the battery within a voltage potential window ranging from about 0.7 V and about 0.07 V versus a lithium reference electrode so that a stress amplitude of the lithium-silicon thin-film negative electrode is maintained from about −0.5 GPa to about 0.3 GPa during the operating of the battery.

2. The method as defined in claim 1 wherein an areal capacity ratio of negative to positive electrodes (N/P ratio) ranges from 1.025 to 3.

3. The method as defined in claim 1, further comprising controlling the voltage potential window to be within a range from about 0.637 V and about 0.1871 V versus the lithium reference electrode.

4. The method as defined in claim 1, further comprising controlling the voltage potential window to be within a range from about 0.5526 V and about 0.1331 V versus the lithium reference electrode.

5. The method as defined in claim 1, further comprising controlling the voltage potential window to be within a range from about 0.4650 V and about 0.0763 V versus the lithium reference electrode.

6. The method as defined in claim 1 wherein:
    the lithium-silicon negative electrode is a lithium-silicon thin-film negative electrode; and
    a capacity of the lithium-silicon negative electrode is about 1.0 mAh/cm$^2$ or greater over at least 10 cycles.

7. The method as defined in claim 1 wherein the stress amplitude of the lithium-silicon negative electrode is maintained at a negative GPa during the operation of the battery.

8. The method as defined in claim 1 wherein the silicon-based active material is silicon or a silicon alloy.

9. The method as defined in claim 1 wherein the lithium-silicon negative electrode is a thin film of silicon having a thickness ranging from about 50 nm to about 50 µm.

10. A method for conditioning a negative electrode, the method comprising:
    incorporating a silicon film having a thickness ranging from about 50 nm to about 50 µm into a silicon-lithium battery as a negative electrode, such that a separator is positioned between the silicon film and a positive electrode;
    soaking the silicon-lithium battery in an electrolyte; and
    operating the lithium-silicon battery within a voltage potential window ranging from about 0.7 V and about 0.07 V versus a lithium reference electrode, thereby conditioning the negative electrode with a compressive stress state;
    wherein the negative electrode retains the compressive stress state so that a stress amplitude of the lithium-silicon negative electrode is maintained from about −0.5 GPa to about 0.3 GPa during subsequent battery cycles operating within the voltage potential window.

11. The method as defined in claim 10, wherein an areal capacity ratio of negative to positive electrodes (N/P ratio) ranges from 1.025 to 3.

12. The method as defined in claim 10, wherein the voltage potential window is within a range from about 0.637 V and about 0.1871 V versus the lithium reference electrode.

13. The method as defined in claim 10, wherein the voltage potential window is within a range from about 0.5526 V and about 0.1331 V versus the lithium reference electrode.

14. The method as defined in claim 10, wherein the voltage potential window is within a range from about 0.4650 V and about 0.0763 V versus the lithium reference electrode.

15. The method as defined in claim 10, wherein a capacity of the lithium-silicon negative electrode is about 1.0 mAh/cm$^2$ or greater over at least 10 cycles.

16. The method as defined in claim 10, wherein the stress amplitude of the lithium-silicon negative electrode is maintained at a negative GPa during subsequent battery cycles operating within the voltage potential window.

17. The method as defined in claim 10, wherein the silicon-based active material is silicon or a silicon alloy.

* * * * *